United States Patent
Bates (10) Patent No.: US 11,287,601 B2
(45) Date of Patent: Mar. 29, 2022

(54) IMAGING LENS ASSEMBLY

(71) Applicant: Snap Inc., Santa Monica, CA (US)

(72) Inventor: Robert Matthew Bates, Erie, CO (US)

(73) Assignee: Snap Inc., Santa Monica, CA (US)

( * ) Notice: Subject to any disclaimer, the term of this patent is extended or adjusted under 35 U.S.C. 154(b) by 229 days.

(21) Appl. No.: 16/483,973

(22) PCT Filed: Feb. 7, 2018

(86) PCT No.: PCT/US2018/017252
§ 371 (c)(1),
(2) Date: Aug. 6, 2019

(87) PCT Pub. No.: WO2018/148301
PCT Pub. Date: Aug. 16, 2018

(65) Prior Publication Data
US 2020/0096726 A1 Mar. 26, 2020

Related U.S. Application Data (60) Provisional application No. 62/455,983, filed on Feb. 7, 2017.

(51) Int. Cl.
*G02B 9/62* (2006.01)
*G02B 7/02* (2021.01)
(Continued)

(52) U.S. Cl.
CPC ............. *G02B 7/028* (2013.01); *G02B 1/041* (2013.01); *G02B 5/226* (2013.01); *G02B 7/021* (2013.01);
(Continued)

(58) Field of Classification Search
CPC ........ G02B 9/62; G02B 1/04; G02B 13/0045; G02B 15/146; G02B 15/1465
See application file for complete search history.

(56) References Cited

U.S. PATENT DOCUMENTS

| 9,557,534 B1 | 1/2017 | Liao et al. |
| 2005/0014218 A1 | 1/2005 | Hagimori et al. |

(Continued)

FOREIGN PATENT DOCUMENTS

| CN | 101435910 A | 5/2009 |
| CN | 201434930 Y | 3/2010 |

(Continued)

OTHER PUBLICATIONS

"International Application Serial No. PCT/US2018/017252, International Preliminary Report on Patentability dated Aug. 22, 2019", 12 pgs.

(Continued)

*Primary Examiner* — Joseph P Martinez
(74) *Attorney, Agent, or Firm* — Schwegman Lundberg & Woessner, P.A.

(57) ABSTRACT

A multi-element imaging lens can be formed from five plastic elements, and an optional null-power or relatively low power sixth plastic element. The lens can use selected plastic materials to reduce a thermal focal shift. In the lens, negative refractive power elements can be formed from plastic materials having a relatively large negative refractive index variation with temperature, abbreviated as dn/dT, while positive refractive power elements can be formed from plastic materials having a relatively small negative dn/dT. Reducing the thermal focal shift, as disclosed, can eliminate the need for an auto-focusing device, such as a voice coil. Reducing the thermal focal shift, as disclosed, can also eliminate the need to use one or more glass elements to further reduce thermal focal shift, which can reduce cost for the lens.

18 Claims, 8 Drawing Sheets

(51) Int. Cl.
  *G02B 1/04* (2006.01)
  *G02B 5/22* (2006.01)
  *G02B 13/00* (2006.01)

(52) U.S. Cl.
  CPC ........... *G02B 9/62* (2013.01); *G02B 13/0045* (2013.01); *G02B 13/0055* (2013.01)

(56) References Cited

U.S. PATENT DOCUMENTS

| | | |
|---|---|---|
| 2014/0247507 A1 | 9/2014 | Tsai |
| 2015/0268446 A1 | 9/2015 | Chen et al. |
| 2016/0124185 A1 | 5/2016 | Tang et al. |

FOREIGN PATENT DOCUMENTS

| | | | | |
|---|---|---|---|---|
| CN | 205049802 | * | 2/2016 | ............ G02B 13/06 |
| CN | 205049802 U | | 2/2016 | |
| CN | 105717611 A | | 6/2016 | |
| CN | 105807398 A | | 7/2016 | |
| CN | 110249251 | | 9/2019 | |
| JP | 2015125405 A | | 7/2015 | |
| JP | 2016188895 A | | 11/2016 | |
| WO | WO-2018148301 A1 | | 8/2018 | |

OTHER PUBLICATIONS

"Korean Application Serial No. 10-2019-7026248, Notice of Preliminary Rejection dated Aug. 18, 2020", w/ English Translation, 11 pgs.
"Korean Application Serial No. 10-2019-7026248, Response filed Oct. 19, 2020 to Notice of Preliminary Rejection dated Aug. 18, 2020", w/ English Claims, 20 pgs.
"International Application Serial No. PCT/US2018/017252, International Search Report dated Aug. 1, 2018", 7 pgs.
"International Application Serial No. PCT/US2018/017252, Invitation to Pay Add'l Fees and Partial Search Report dated May 30, 2018", 11 pgs.
"International Application Serial No. PCT/US2018/017252, Written Opinion dated Aug. 1, 2018", 10 pgs.
"Chinese Application Serial No. 201880010355.5, Office Action dated Jan. 12, 2021", w/English Translation, 10 pgs.
"Chinese Application Serial No. 201880010355.5, Response filed May 27, 2021 to Office Action dated Jan. 12, 2021", w/ English Claims, 12 pgs.
"Korean Application Serial No. 10-2019-7026248, Notice of Preliminary Rejection dated Feb. 25, 2021", w/ English translation, 4 pgs.

* cited by examiner

| Power for each lens element, normalized to power of lens assembly | Range 1 | | Range 2 | | Range 3 | |
|---|---|---|---|---|---|---|
| | min | max | min | max | min | max |
| Lens element 1 | -68% | -51% | -68% | -60% | -65% | -60% |
| Lens element 2 (optional) | 0% | 5% | 0% | 0% | 0% | 0% |
| Lens element 3 | 75% | 110% | 75% | 105% | 75% | 80% |
| Lens element 4 | -61% | -42% | -58% | -42% | -58% | -42% |
| Lens element 5 | 91% | 112% | 91% | 101% | 99% | 100% |
| Lens element 6 | -97% | -38% | -61% | -38% | -44% | -38% |

FIG. 3

Lens prescription for Sample Design 1 (Table 1 of 2)

| Surf. | Label | Curvature Radius | Thickness | Material | Index (d-line) | Abbe # |
|---|---|---|---|---|---|---|
| 1 | Element 1 | 1.71E+00 | 0.400 | 480R | 1.523503 | 56.30 |
| 2 | | 0.686738407 | 0.914 | | | |
| 3 | Element 2 | Plano | 0.500 | Air | | |
| 4 | | Plano | 0.060 | | | |
| 5 | Aperture Stop | Plano | -0.035 | | | |
| 6 | Element 3 | 3.010916923 | 0.492 | F52R | 1.533275 | 55.89 |
| 7 | | -1.453307677 | 0.252 | | | |
| 8 | Element 4 | 2.545425468 | 0.328 | OKP-A2 | 1.657820 | 20.48 |
| 9 | | 1.031124255 | 0.088 | | | |
| 10 | Element 5 | 1.646810991 | 1.068 | F52R | 1.533275 | 55.89 |
| 11 | | -1.253384299 | 0.241 | | | |
| 12 | Element 6 | 3.887281966 | 0.289 | OKP-A2 | 1.657820 | 20.48 |
| 13 | | 1.406140902 | 0.300 | | | |
| 14 | IR-Filter | Plano | 0.300 | N-BK7 | 1.516857 | 64.09 |
| 15 | | | 0.394 | | | |

FIG. 4

| Lens prescription for Sample Design 1 (Table 2 of 2) | | | | | | |
|---|---|---|---|---|---|---|
| Surf. | k | A4 | A6 | A8 | A10 | A12 | A14 |
| 1 | 0 | 7.80185E-02 | -4.39897E-02 | -3.10449E-02 | 1.40211E-02 | -1.80748E-03 | |
| 2 | -0.92 | 4.14479E-01 | 4.27112E-01 | -9.88475E-01 | 1.45524E+00 | -1.08274E+00 | |
| 3 | | | | | | | |
| 4 | | | | | | | |
| 5 | | | | | | | |
| 6 | 0 | -1.27559E-01 | 3.78306E-01 | -1.66746E+00 | | | |
| 7 | 0 | -7.71550E-02 | -1.32181E-01 | 1.61914E-01 | -1.28740E+00 | 2.54372E-14 | |
| 8 | 0 | -5.22482E-01 | 9.10325E-01 | -1.44911E+00 | 3.49013E-01 | 6.06099E-01 | |
| 9 | 0 | -9.66265E-01 | 1.59447E+00 | -2.43575E+00 | 1.96213E+00 | -7.85892E-01 | |
| 10 | 0 | -3.63295E-01 | 3.38475E-01 | -2.32498E-02 | -1.18763E-01 | 1.93037E-02 | |
| 11 | 0 | 2.09912E-01 | -4.45881E-01 | 8.98873E-01 | -1.08944E+00 | 8.15357E-01 | -2.28867E-01 |
| 12 | 0 | -3.27953E-01 | -5.32403E-01 | 1.08230E+00 | -1.04871E+00 | 5.90407E-01 | -1.31598E-01 |
| 13 | 0 | -4.92798E-01 | 4.34225E-02 | 2.77583E-01 | -3.32142E-01 | 1.63663E-01 | -3.13752E-02 |
| 14 | | | | | | | |
| 15 | | | | | | | |

*FIG. 5*

Lens prescription for Sample Design 2 (Table 1 of 2)

| Surf. | Label | Curvature Radius | Thickness | Material | Index (d-line) | Abbe # |
|---|---|---|---|---|---|---|
| 1 | Element1 | 4.91136 | 0.427 | 480R | 1.52365 | 55.9 |
| 2 | | 1.07033 | 1.042 | | | |
| 3 | Element2 | Plano | 0.856 | OKP-A1 | 1.64705 | 21.6 |
| 4 | | Plano | 0.128 | | | |
| 5 | Aperture Stop | Plano | -0.034 | | | |
| 6 | Element3 | 2.75574 | 0.981 | F52R | 1.53328 | 55.3 |
| 7 | | -1.05123 | 0.060 | | | |
| 8 | Element4 | -12.53552 | 0.318 | OKP4 | 1.60493 | 26.8 |
| 9 | | 1.54467 | 0.072 | | | |
| 10 | Element5 | 2.05567 | 1.100 | F52R | 1.53328 | 55.3 |
| 11 | | -1.34994 | 0.290 | | | |
| 12 | Element6 | -5.93082 | 0.344 | OKP-A1 | 1.64705 | 21.6 |
| 13 | | 2.18440 | 0.300 | | | |
| 14 | IR-Filter | Plano | 0.300 | N-BK7 | 1.51686 | 64.1 |
| 15 | | | 0.526 | | | |

FIG. 6

| Surf. | k | A4 | A6 | A8 | A10 | A12 |
|---|---|---|---|---|---|---|
| 1 | 0 | 7.85620E-02 | -2.44744E-02 | 2.31299E-03 | | |
| 2 | -0.890919543 | 2.17172E-01 | 2.82598E-02 | 1.27572E-01 | -1.03880E-01 | 2.08342E-03 |
| 3 | | | | | | |
| 4 | | | | | | |
| 5 | | | | | | |
| 6 | 0 | -1.52616E-01 | -1.62947E-01 | -2.18107E-01 | 2.15205E-01 | -2.26696E+00 |
| 7 | 0 | -1.09024E-02 | -5.45716E-02 | 1.31210E-01 | -1.80418E-01 | 1.84528E-02 |
| 8 | 0 | -3.28672E-01 | 3.10014E-01 | -1.44111E-01 | 9.38980E-02 | -1.83354E-02 |
| 9 | 0 | -4.21100E-01 | 3.78229E-01 | -1.76540E-01 | 3.83936E-02 | -1.29952E-02 |
| 10 | 0 | -1.21821E-01 | 1.96445E-02 | 7.46990E-02 | -3.72627E-02 | -4.78592E-03 |
| 11 | 0 | 2.14695E-01 | -1.37516E-01 | 4.98654E-02 | 2.16506E-02 | 2.14236E-03 |
| 12 | 0 | -5.78668E-02 | -2.11908E-01 | 7.62149E-02 | 1.54935E-02 | -1.96363E-03 |
| 13 | 0 | -2.00238E-01 | 2.51254E-02 | 5.10181E-03 | -2.67964E-03 | 2.78442E-04 |
| 14 | | | | | | |
| 15 | | | | | | |

Lens prescription for Sample Design 2 (Table 2 of 2)

IMAGING LENS ASSEMBLY

PRIORITY APPLICATIONS

This application is a U.S. National Stage Filing under 35 U.S.C. 371 from International Application No. PCT/US2018/017252, filed on Feb. 7, 2018, and published as WO2018/148301 on Aug. 16, 2018, which claims the benefit of priority to U.S. Provisional Patent Application Ser. No. 62/455,983, filed Feb. 7, 2017; the benefit of priority of each of which is hereby claimed herein, and which applications and publication are hereby incorporated herein by reference in their entireties.

FIELD OF THE DISCLOSURE

The present disclosure relates to an imaging lens assembly.

BACKGROUND OF THE DISCLOSURE

It is difficult to design and manufacture an imaging lens assembly that maintains its focus over a suitable wide range of temperatures. For example, at particular temperatures, thermal variation of the refractive index of the lens elements can translate the focal plane of the imaging lens assembly toward or away from a sensor, leading to a blurry image on the sensor.

SUMMARY

In one example of an imaging lens assembly having a positive total refractive power, the imaging lens assembly can include, in order from an object side to an image side: a first lens element with negative refractive power between 51% and 68% of the total refractive power; a second lens element with zero or positive refractive power between 0% and 5% of the total refractive power; a third lens element with positive refractive power between 75% and 110% of the total refractive power; a fourth lens element with negative refractive power between 42% and 61% of the total refractive power; a fifth lens element with positive refractive power between 91% and 112% of the total refractive power; and a sixth lens element with a negative refractive power between 38% and 97% of the total refractive power.

In another example of an imaging lens assembly having a positive total refractive power, the imaging lens assembly can include, in order from an object side to an image side: a first lens element with negative refractive power and formed from a material having an Abbe number greater than 50; a second lens element formed from a material having an Abbe number less than 35; a third lens element with positive refractive power and formed from a material having an Abbe number greater than 50; a fourth lens element with negative refractive power and formed from a material having an Abbe number less than 27; a fifth lens element with positive refractive power and formed from a material having an Abbe number greater than 50; and a sixth lens element with a negative refractive power and formed from a material having an Abbe number less than 27.

In another example of an imaging lens assembly having a positive total refractive power, the imaging lens assembly can include, in order from an object side to an image side: a first lens element with negative refractive power between 51% and 68% of the total refractive power; a second lens element with positive refractive power between 75% and 110% of the total refractive power; a third lens element with negative refractive power between 42% and 61% of the total refractive power; a fourth lens element with positive refractive power between 91% and 112% of the total refractive power; and a fifth lens element with a negative refractive power between 38% and 97% of the total refractive power.

In another example of an imaging lens assembly having a positive total refractive power, the imaging lens assembly can include, in order from an object side to an image side: a first lens element with negative refractive power and formed from a material having an Abbe number greater than 50; a second lens element with positive refractive power and formed from a material having an Abbe number greater than 50; a third lens element with negative refractive power and formed from a material having an Abbe number less than 27; a fourth lens element with positive refractive power and formed from a material having an Abbe number greater than 50; and a fifth lens element with a negative refractive power and formed from a material having an Abbe number less than 27.

BRIEF DESCRIPTION OF THE DRAWINGS

Corresponding reference characters indicate corresponding parts throughout the several views. Elements in the drawings are not necessarily drawn to scale. The configurations shown in the drawings are merely examples, and should not be construed as limiting the scope of the invention in any manner.

DETAILED DESCRIPTION

A multi-element imaging lens can be formed from five plastic elements, and an optional null-power or relatively low power sixth plastic element. The lens can use selected plastic materials to reduce a thermal focal shift. In the lens, negative refractive power elements can be formed from plastic materials having a relatively large (absolute magnitude) negative refractive index variation with temperature, abbreviated as dn/dT, while positive refractive power elements can be formed from plastic materials having a relatively small (absolute magnitude) negative dn/dT. Reducing the thermal focal shift, as disclosed, can eliminate the need for an auto-focusing device, such as a voice coil. Reducing the thermal focal shift, as disclosed, can also eliminate the need to use one or more glass elements to further reduce thermal focal shift, which can reduce cost for the lens.

In the following discussion, the Abbe number (also known as V-number) of a material is defined as defined as the dimensionless quantity $(n_d-1)/(n_F-n_C)$, where nd is a refractive index of the material at a wavelength of 587.6 nm (helium d-line), $n_F$ is a refractive index of the material at a wavelength of 486.1 nm (hydrogen F-line), and $n_C$ is a refractive index of the material at a wavelength of 656.3 nm (hydrogen C-line). In general, the higher the Abbe number of a material, the lower the dispersion of the material.

In the following discussion, the quantity dn/dT is used to represent a change in refractive index (n) of a material, with respect to temperature (T). The quantity dn/dT is evaluated at a temperature of 25 C, at a wavelength of 587.6 nm (helium d-line). The higher the value of dn/dT, the greater the variation in refractive index with temperature. In the following discussion, when a size of the quantity dn/dT is mentioned, it will be understood that the size corresponds to a size of an absolute magnitude of the quantity dn/dT. Relatively large values of dn/dT are farther away from zero than relatively small values of dn/dT. In addition, it will be understood that the values of Abbe number and dn/dT can vary slightly from batch-to-batch of the optical material. Although optical material manufacturers typically attempt to minimize batch-to-batch variations, some variation is unavoidable in practice. The values of Abbe number and dn/dT discussed herein are published values specified by the material manufacturers.

The following discussion mentions various optical plastic materials, all of which are commercially available, and all of which have well-defined and well-documented optical and mechanical properties that are readily known to one of ordinary skill in the art. The plastic materials discussed herein can be formed of one or more polymeric materials, and/or one or more plastic materials. In some examples, the plastic materials discussed herein exclude glass materials and/or exclude fused silica.

In the discussion that follows, various optical elements are referred to as first lens element, second lens element, and so forth. It will be understood that the numbering scheme is provided merely for convenience, and to specify an order in which the numbered elements appear. In some examples, one or more additional optical elements can optionally appear between the numbered elements. For example, a planar spectral filter can appear before a first lens element, between a first lens element and a second lens element, between a second lens element and a third lens element, between a fifth lens element and a sixth lens element, after a sixth lens element, and so forth.

Figure 1:
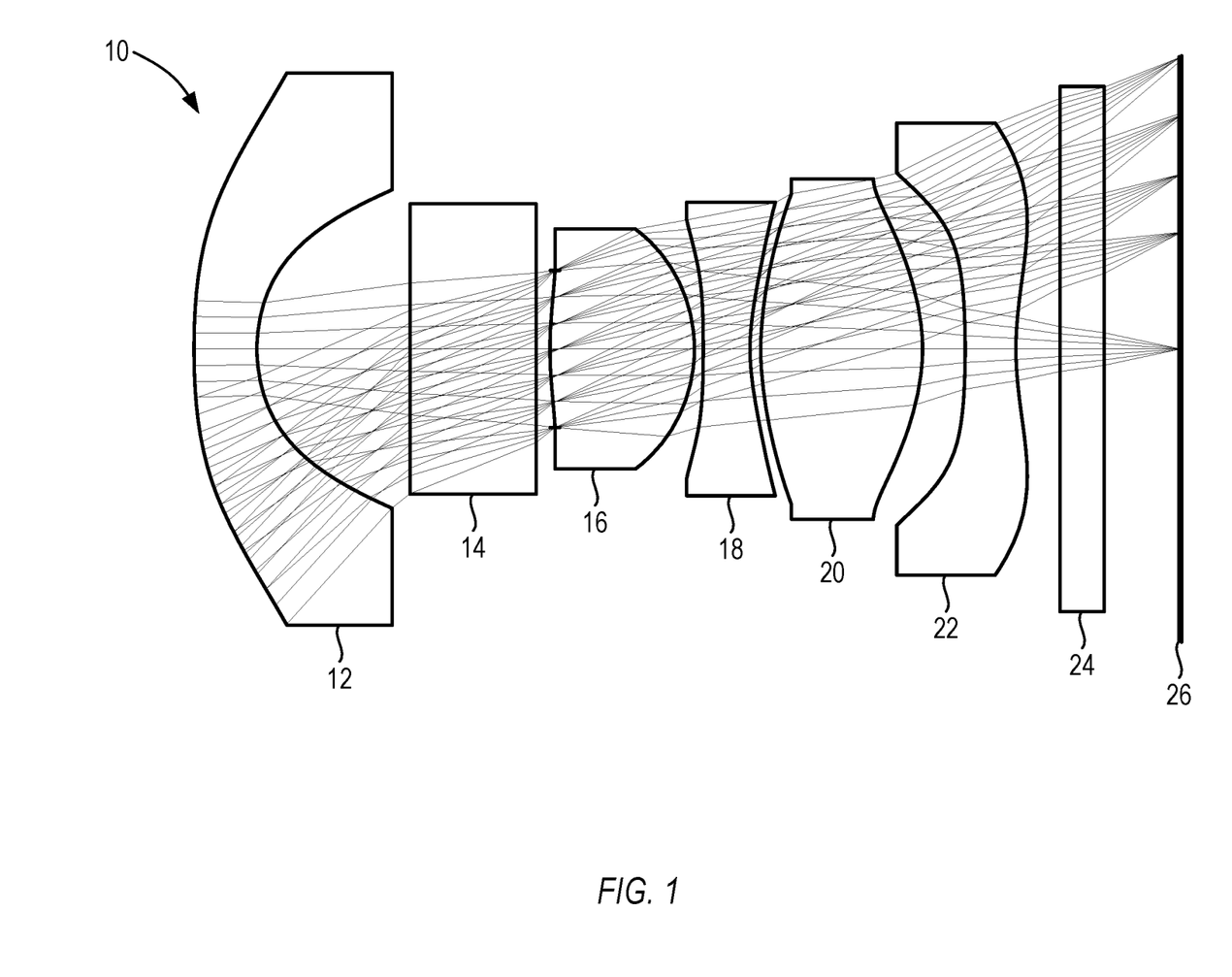
FIG. 1 shows a cross-sectional side view of an imaging lens assembly, in accordance with some examples, with examples of light rays superimposed on the lens surfaces.
Figure 2:
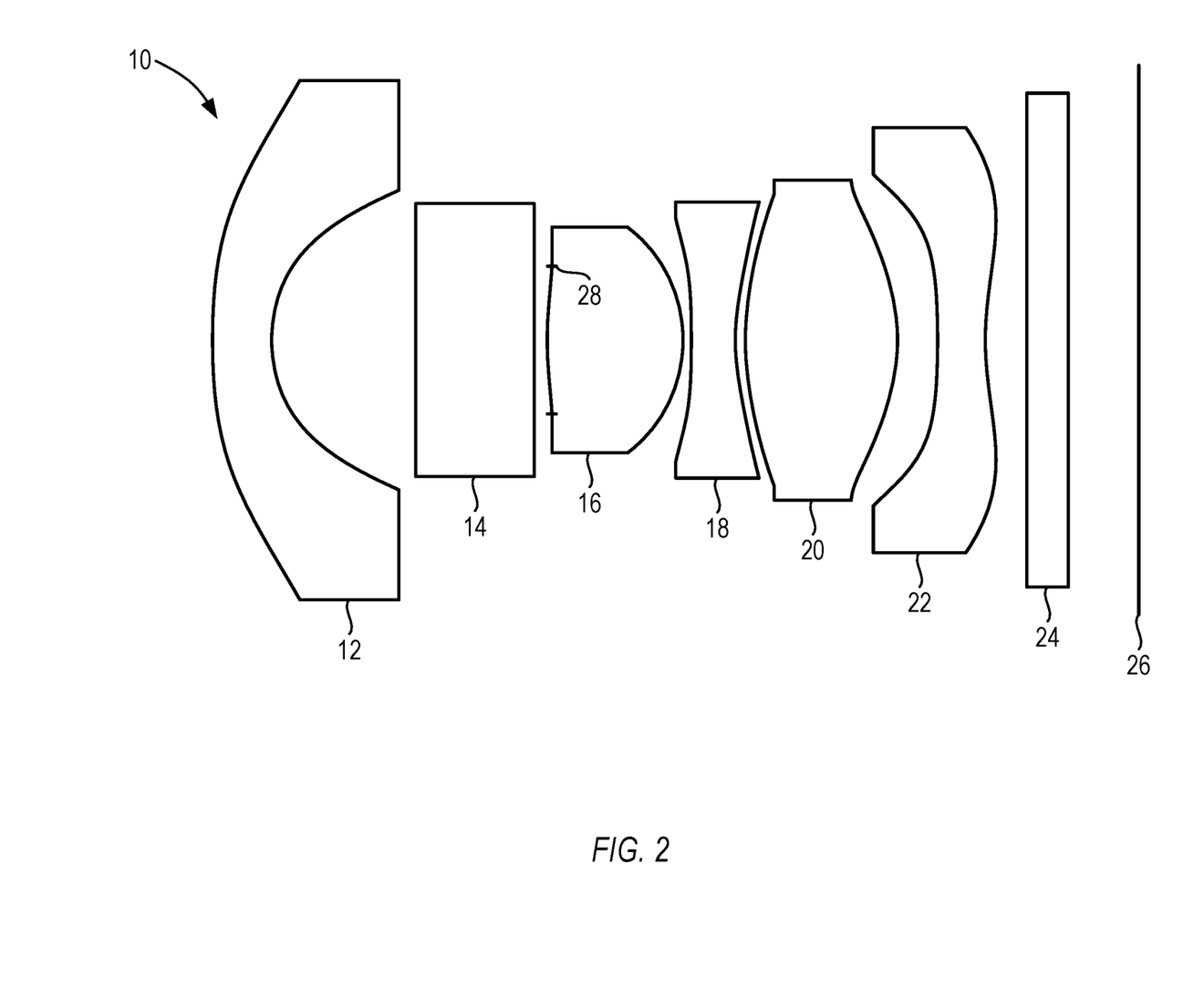
FIG. 2 shows the cross-sectional side view of the imaging lens assembly of FIG. 1, in accordance with some examples, with the light rays removed.

FIG. 1 shows a cross-sectional side view of an imaging lens assembly 10, in accordance with some examples, with examples of simulated light rays superimposed on the lens surfaces. FIG. 2 shows the cross-sectional side view of the imaging lens assembly of FIG. 1, in accordance with some examples, with the light rays removed.

Such an imaging lens assembly 10 is suitable for relatively wide-angle application, such as a mobile phone. The example of FIG. 1 is but one example of an imaging lens assembly 10; other suitable imaging lens assemblies can also be used.

The imaging lens assembly 10 can have a positive total refractive power. The imaging lens assembly 10 can be scaled in size as needed, to accommodate a desired focal length or desired refractive power (typically represented as 1/the focal length). For discussion below, the power of each lens element is scaled by the total refractive power of the imaging lens assembly 10.

The imaging lens assembly 10 can include, in order from an object side to an image side, a first lens element 12, an optional second lens element 14, a third lens element 16, a fourth lens element 18, a fifth lens element 20, and a sixth lens element 22. A blue glass absorptive filter 24 can be positioned between the sixth lens element 22 and an image plane 26. FIG. 2 shows an aperture stop 28 of the imaging lens assembly 10 positioned at an object-side surface of the third lens element 16.

Each lens element includes an object-facing surface and an image-facing surface opposite the object-facing surface. The object-facing surface and the image-facing surface can each be shaped to have a base radius of curvature. The radii of curvature of the two surfaces, the refractive index of the element material, and a vertex-to-vertex (e.g., on-axis) thickness between the surfaces can determine an optical power of the element, in accordance with the well-known lensmaker's equation. For aspheric surfaces, each surface can additionally include a conic constant, denoted as quantity k, which may or may not be zero. For aspheric surfaces, each surface can additionally include one or more aspheric coefficients, denoted as quantities A4, A6, A8, and so forth, each of which may or may not be zero. Spherical surfaces include a conic constant of zero and aspheric coefficients that all equal zero.

Figure 3:
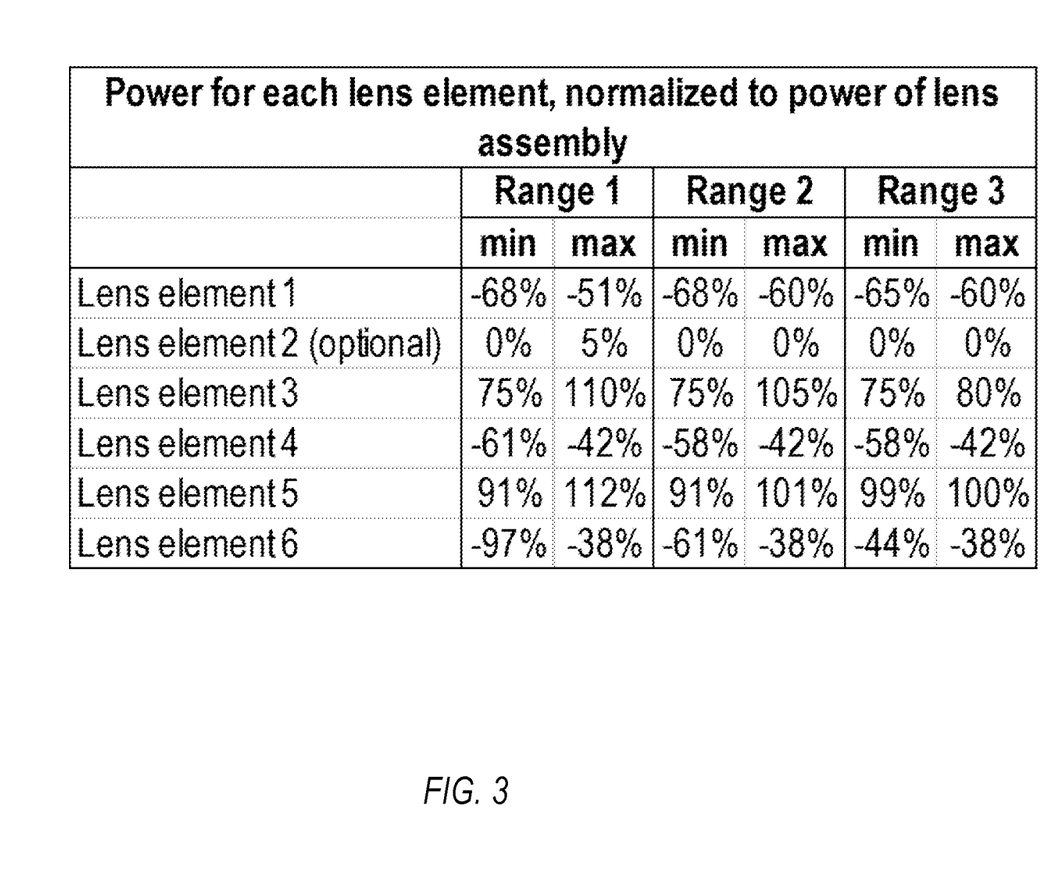
FIG. 3 includes a table showing three suitable ranges of relative power values for each lens element, for the imaging lens assembly of FIGS. 1 and 2, in accordance with some examples.

The precise shapes of the lens element surfaces can be varied within particular ranges. FIG. 3 includes a table showing three suitable ranges of relative power values for each lens element, for the imaging lens assembly of FIGS. 1 and 2, in accordance with some examples. Each value in the table of FIG. 3 is normalized by the total power of the lens assembly.

In some examples, the first lens element 12 can have negative refractive power between 51% and 68% of the total refractive power. In some examples, the first lens element 12 can have negative refractive power between 60% and 68% of the total refractive power. In some examples, the first lens element 12 can have negative refractive power between 60% and 65% of the total refractive power. In some examples, the first lens element 12 can be formed from a material having an Abbe number greater than 50. In some examples, the first lens element 12 can be formed from a material having a dn/dT less than $-99 \times 10^{-6}/°$ C. In some examples, the first lens element 12 can be formed from one of Zeonex 480R, Zeonex 330R, or APL5014CL. In some examples, the first lens element 12 can be formed from Zeonex 480R, which has an Abbe number of 56, and has a dn/dT of $-106 \times 10^{-6}/°$ C. In some examples, the first lens element 12 can use a high index crown material, such as Zeonex 480R, which is unusual for typical multi-element imaging lens designs.

In some examples, the optional second lens element 14 can have zero or positive refractive power between 0% and 5% of the total refractive power. In some examples, the optional second lens element 14 can have zero refractive power, such a planar element. In some examples, the second lens element 14 can be formed from a material having an Abbe number less than 35. In some examples, the second lens element 14 can be formed from one of OKP-A1, OKP1, Ultem PEI (Polyetherimide), polystyrene, or polycarbonate. In some examples, the second lens element 14 can be formed from OKP-A1, which has an Abbe number of 22, and has a dn/dT of $-133 \times 10^{-6}/°$ C. In some examples, the second lens element 14 can introduce lateral chromatic aberration correction with little impact to athermalization, as-built performance, or cost.

In some examples, the third lens element 16 can have positive refractive power between 75% and 110% of the total refractive power. In some examples, the third lens element 16 can have positive refractive power between 75% and 105% of the total refractive power. In some examples, the third lens element 16 can have positive refractive power between 75% and 80% of the total refractive power. In some examples, the third lens element 16 can be formed from a material having an Abbe number greater than 50. In some examples, the third lens element 16 can be formed from a material having a material having a dn/dT greater than −95×10$^{-6}$/° C. In some examples, the third lens element 16 can be formed from Zeonex F52R, which has an Abbe number of 56, and has a dn/dT of −93×10$^{-6}$/° C. In some examples, an aperture stop 28 of the imaging lens assembly 10 can be positioned at an object-side surface of the third lens element 16.

In some examples, the fourth lens element 18 can have negative refractive power between 42% and 61% of the total refractive power. In some examples, the fourth lens element 18 can have negative refractive power between 42% and 58% of the total refractive power. In some examples, the fourth lens element 18 can be formed from a material having an Abbe number less than 27. In some examples, the fourth lens element 18 can be formed from a material having a dn/dT less than −118×10$^{-6}$/° C. In some examples, the fourth lens element 18 can be formed from one of OKP4, OKP1, OKP-A1, OKP-A2, or EP-8000. In some examples, the fourth lens element 18 can be formed from OKP4, which has an Abbe number of 27, and has a dn/dT of −152×10$^{-6}$/° C.

In some examples, the fifth lens element 20 can have positive refractive power between 91% and 112% of the total refractive power. In some examples, the fifth lens element 20 can have positive refractive power between 91% and 101% of the total refractive power. In some examples, the fifth lens element 20 can have positive refractive power between 99% and 100% of the total refractive power. In some examples, the fifth lens element 20 can be formed from a material having an Abbe number greater than 50. In some examples, the fifth lens element 20 can be formed from a material having a dn/dT greater than −95×10$^{-6}$/° C. In some examples, the fifth lens element 20 can be formed from Zeonex F52R, which has an Abbe number of 56, and has a dn/dT of −93×10$^{-6}$/° C.

In some examples, the sixth lens element 22 can have negative refractive power between 38% and 97% of the total refractive power. In some examples, the sixth lens element 22 can have negative refractive power between 38% and 61% of the total refractive power. In some examples, the sixth lens element 22 can have negative refractive power between 38% and 44% of the total refractive power. In some examples, the sixth lens element 22 can be formed from a material having an Abbe number less than 27. In some examples, the sixth lens element 22 can be formed from a material having a dn/dT less than −118×10$^{-6}$/° C. In some examples, the sixth lens element 22 can formed from one of OKP1, OKP4, OKP-A1, OKP-A2, EP-8000, or Ultem PEI. In some examples, the sixth lens element 22 can be formed from OKP1, which has an Abbe number of 22, and has a dn/dT of −138×10$^{-6}$/° C. In some examples, the fourth lens element 18 and the sixth lens element 22 can be low Abbe number flints, such as PEI or EP-8000. The large magnitude negative dn/dT materials in the OKP catalog for the fourth and sixth lens elements can compromise lateral chromatic aberration correction and, as a result, are not used in typical multi-element imaging lenses. Using the large magnitude negative dn/dT materials in the present design therefore provides an unexpected benefit for athermalization.

In some examples, the designs can use all plastic elements in a plastic barrel with plastic spacers. Although plastic elements tend to have relatively large coefficients of thermal expansion, the design can reduce or minimize the thermal focal shift, by selecting materials with a relatively large negative dn/dT for the negative-powered lens elements and a relatively small negative dn/dT for the positive-powered lens elements. In some examples, the plastic optics can have coefficients of thermal expansion between 59×10$^{-6}$/° C. and 74×10$^{-6}$/° C. In practice, the performance of the lens can be relatively insensitive to thermal expansion of the plastic optics, for values in the cited range. In some examples, the spacers, holder, and lens barrel can all have coefficients of thermal expansion of 55×10$^{-6}$/° C. In practice, values greater than the cited value can improve athermalization of the lens, and can also be used.

Figure 4:
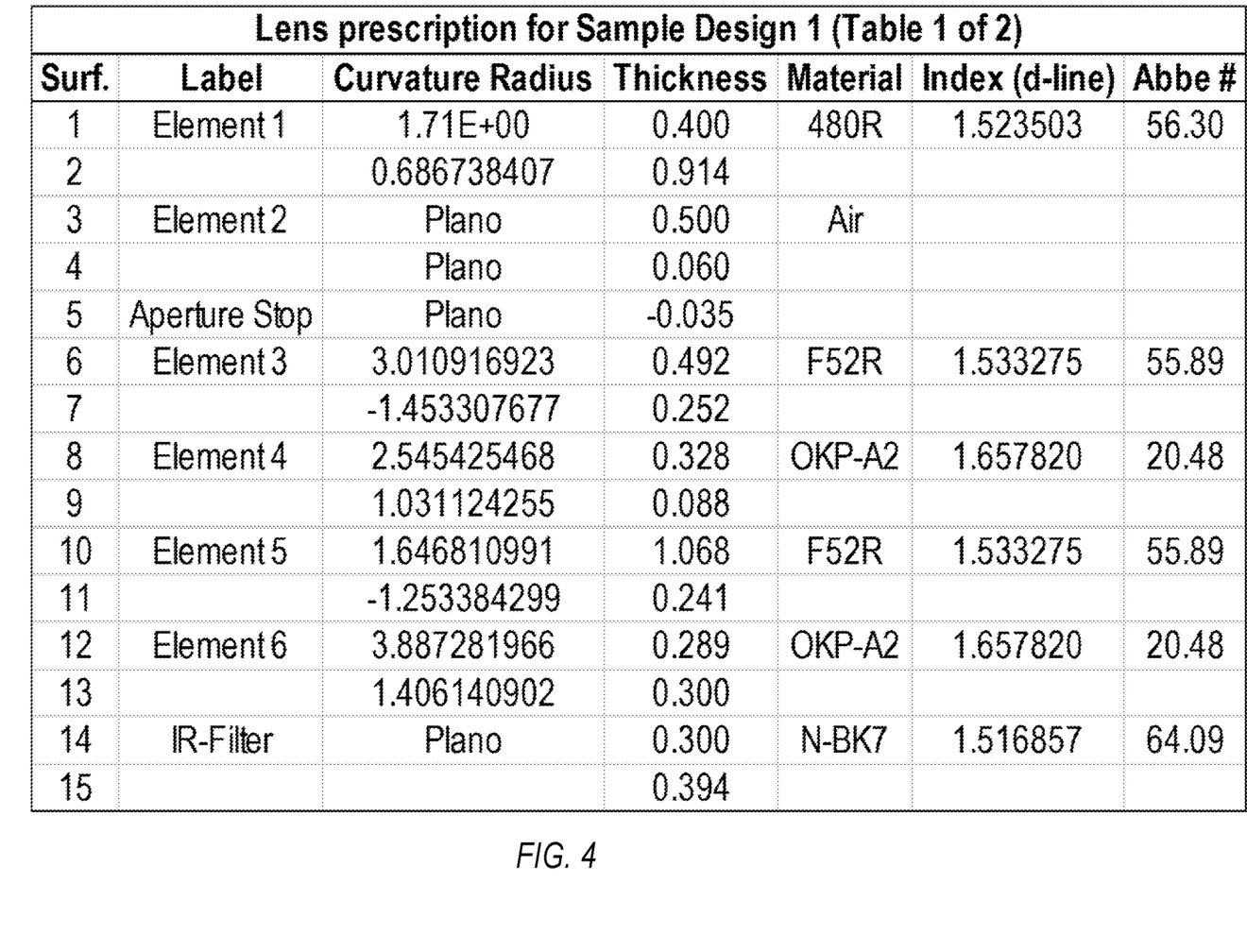
FIGS. 4 and 5 include tables showing a prescription of a first sample imaging lens assembly design, in accordance with some examples.
Figure 5:
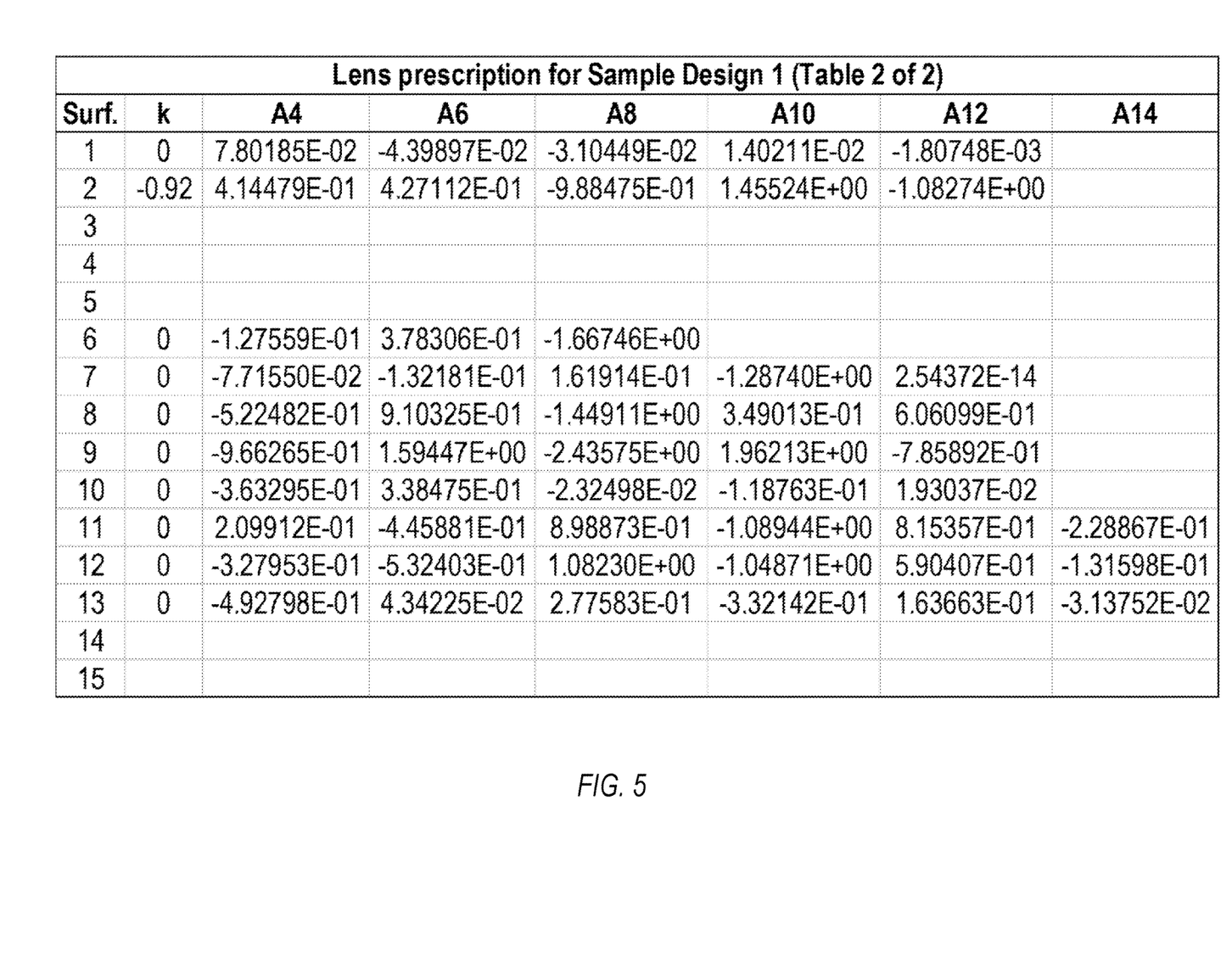

FIGS. 4 and 5 include tables showing a prescription of a first sample imaging lens assembly design ("Design 1"), in accordance with some examples. Design 1 omits the optional second element. The prescription of Design 1 is consistent with the ranges shown in FIG. 3.

Figure 6:
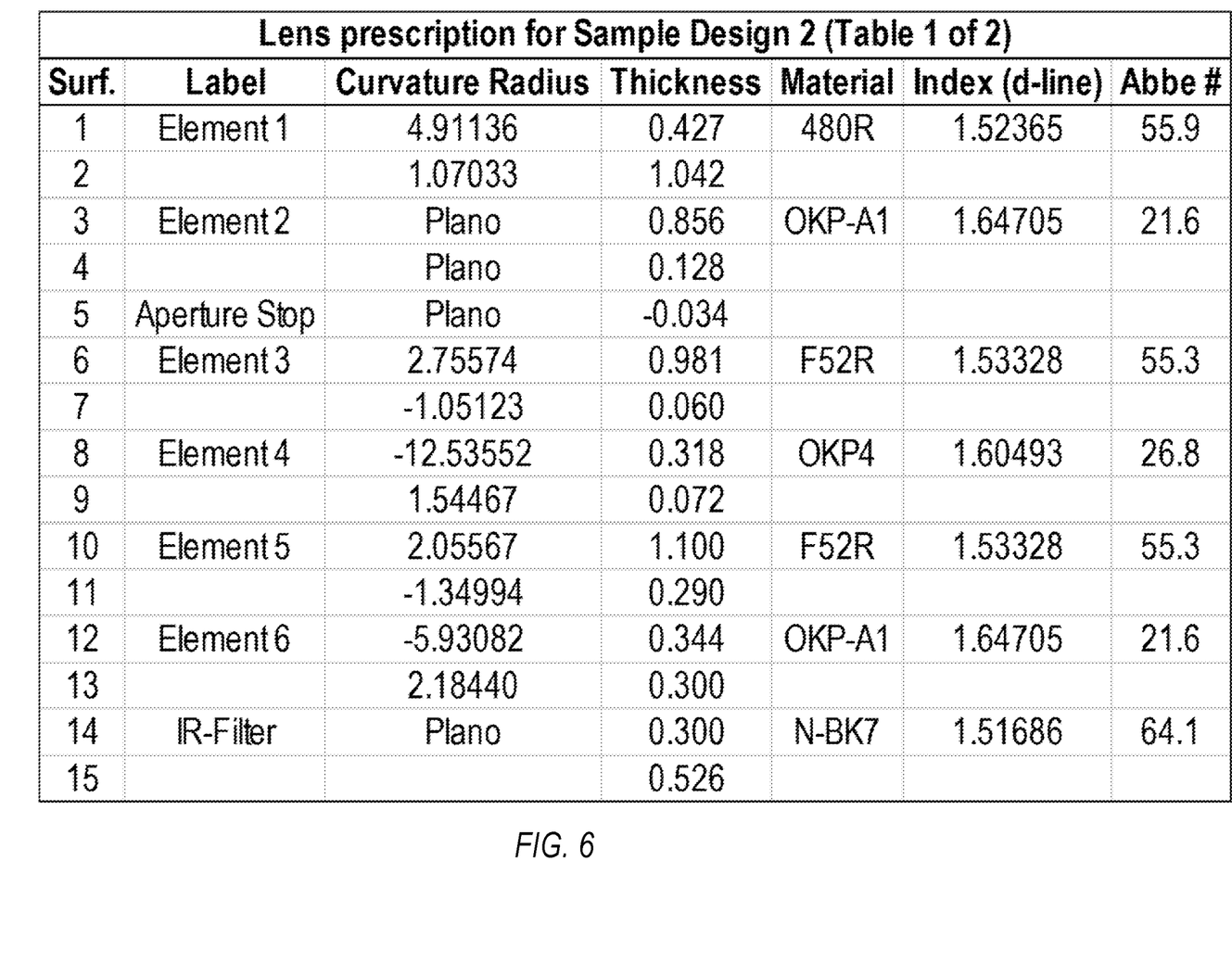
FIGS. 6 and 7 include tables showing a prescription of a second sample imaging lens assembly design, in accordance with some examples.
Figure 7:
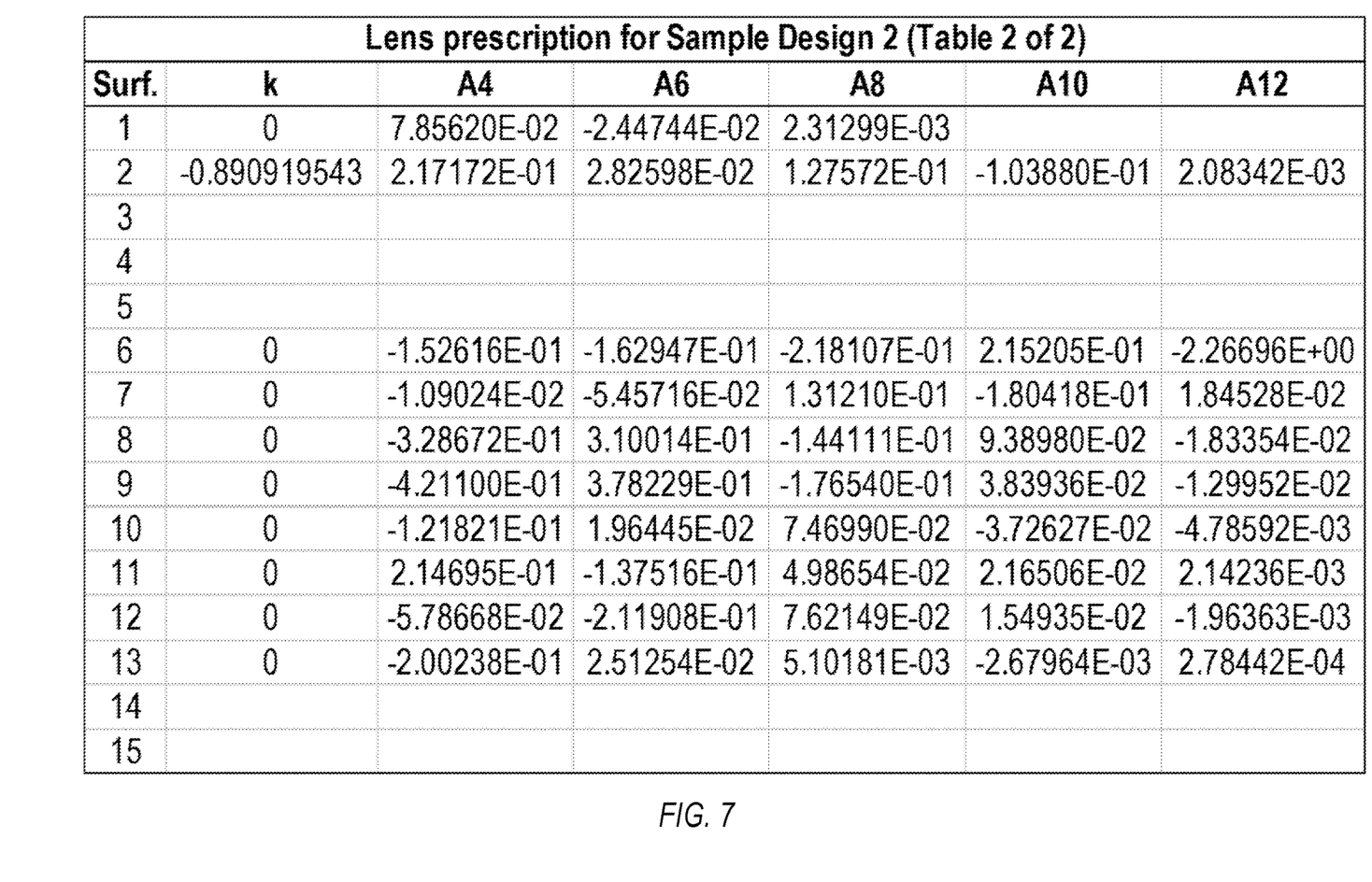

FIGS. 6 and 7 include tables showing a prescription of a second sample imaging lens assembly design ("Design 2"), in accordance with some examples. Design 2 includes the optional second element. The prescription of Design 2 is consistent with the ranges shown in FIG. 3.

To evaluate the configuration of Design 2 (FIGS. 6 and 7), the imaging lens assembly 10 is scaled to have an effective focal length of 1.57 mm, or, equivalently, a total refractive power of 0.637 mm$^{-1}$. After scaling, the imaging lens assembly 10 has a length of 6.71 mm, from the object-side surface of the first lens element 12 to the image plane 26. The field of view is set to 115 degrees at a diagonal, with 120 degrees to an image circle. At this field of view, the f-number of the imaging lens assembly 10 is 2.4. At an image height of 1.98 mm, the calculated distortion is −20.4%. The following paragraphs summarize a simulated performance of the lens of Design 2.

At a temperature of 20 C, a polychromatic (e.g., using wavelengths from 486.1 nm to 656.3 nm) Modulation Transfer Function (MTF), at 76 cycles per mm, has a value of 0.80 for a sagittal image height of 0 mm, a value of 0.80 for a sagittal image height of 0.792 mm, a value of 0.75 for a sagittal image height of 1.188 mm, a value of 0.72 for a sagittal image height of 1.584 mm, a value of 0.80 for a tangential image height of 0 mm, a value of 0.79 for a tangential image height of 0.792 mm, a value of 0.66 for a tangential image height of 1.188 mm, and a value of 0.70 for a tangential image height of 1.584 mm.

At a temperature of 40 C, a polychromatic MTF, at 76 cycles per mm, has a value of 0.84 for a sagittal image height of 0 mm, a value of 0.84 for a sagittal image height of 0.792 mm, a value of 0.78 for a sagittal image height of 1.188 mm, a value of 0.70 for a sagittal image height of 1.584 mm, a value of 0.84 for a tangential image height of 0 mm, a value of 0.84 for a tangential image height of 0.792 mm, a value of 0.67 for a tangential image height of 1.188 mm, and a value of 0.66 for a tangential image height of 1.584 mm.

At a temperature of 60 C, a polychromatic MTF, at 76 cycles per mm, has a value of 0.80 for a sagittal image height of 0 mm, a value of 0.80 for a sagittal image height of 0.792 mm, a value of 0.75 for a sagittal image height of 1.188 mm, a value of 0.65 for a sagittal image height of 1.584 mm, a value of 0.80 for a tangential image height of 0 mm, a value of 0.69 for a tangential image height of 0.792 mm, a value of 0.60 for a tangential image height of 1.188 mm, and a value of 0.56 for a tangential image height of 1.584 mm.

At a temperature of 20 C, the on-axis (e.g., sagittal image height of 0 mm and tangential image height of 0 mm) polychromatic MTF peaks at a value of 0.84 at a focus shift of about −5 microns, and falls to 0.42 at focus shifts of −30 microns and +20 microns.

At a temperature of 40 C, the on-axis polychromatic MTF peaks at a value of 0.84 at a focus shift of about +2 microns, and falls to 0.42 at focus shifts of −23 microns and +27 microns.

At a temperature of 60 C, the on-axis polychromatic MTF peaks at a value of 0.84 at a focus shift of about +7 microns, and falls to 0.42 at focus shifts of −18 microns and +34 microns.

A lateral color at a wavelength of 410 nm rises from 0 microns to a maximum value of about 8.0 microns, then falls to about 1.8 microns at a maximum field of 57.5 degrees. A lateral color at a wavelength of 486.1 nm rises from 0 microns to a maximum value of about 1.1 microns, then falls to about −1.8 microns at a maximum field of 57.5 degrees. A lateral color at a wavelength of 587.6 nm is set to the reference level (e.g., remains 0 microns over the full field). A lateral color at a wavelength of 656.3 nm rises from 0 microns to a maximum value of about 1.5 microns at a maximum field of 57.5 degrees. For reference, the Airy disc radius is about +/−2 microns at the reference wavelength of 587.6 nm.

An incident angle for a chief ray rises from 0 degrees at an image height of 0 mm to +30 degrees at an image height of 1.98 mm. An incident angle for a lower rim ray rises from −12 degrees at an image height of 0 mm to +22 degrees at an image height of 1.98 mm. An incident angle for an upper rim ray rises from +12 degrees at an image height of 0 mm to +40 degrees at an image height of 1.98 mm.

A field curvature at a wavelength of 486 nm drops from 0 microns on-axis to about −54 microns at a field of 57.5 degrees in the sagittal direction, and oscillates between about −10 microns and +10 microns over the field in the tangential direction. A field curvature at a wavelength of 588 nm drops from −14 microns on-axis to about −62 microns at a field of 57.5 degrees in the sagittal direction, and oscillates between about −14 microns and +31 microns over the field in the tangential direction. A field curvature at a wavelength of 656 nm drops from −17 microns on-axis to about −63 microns at a field of 57.5 degrees in the sagittal direction, and oscillates between about −17 microns and +41 microns over the field in the tangential direction.

An f-tan distortion rises from 0% on-axis to about −20% at a field of 57.5 degrees.

A relative illumination drops from 1.0 on-axis, to about 0.58 at a field of 57.5 degrees.

In the design phase, the lens prescriptions can be altered slightly, to accommodate a continuum of lens designs that can range from excellent athermalization with poor as-built performance to poorer athermalization with excellent as-built performance.

For a configuration in which the performance is best athermalized, the materials of the first through sixth lens elements can be Zeonex 480R, OKP1, Zeonex F52R, OKP4, Zeonex F52R, and OKP4, respectively. For these materials, the full thermal shift from 25 C to 60 C is 6.5 microns.

For a configuration in which the performance is best compromised, the materials of the first through sixth lens elements can be Zeonex 480R, OKP-A1, Zeonex F52R, OKP4, Zeonex F52R, and OKP-A1, respectively. For these materials, the full thermal shift from 25 C to 60 C is 8 microns.

For a configuration in which the performance is highest yielding, the materials of the first through sixth lens elements can be Zeonex 480R, OKP-A1, Zeonex F52R, OKP1, Zeonex F52R, and OKP4, respectively. For these materials, the full thermal shift from 25 C to 60 C is 11 microns.

For a configuration in which the performance is best compromised in which the optional second element is eliminated, the materials of the first and third through fifth lens elements can be Zeonex 480R, Zeonex F52R, OKP4, Zeonex F52R, and OKP-A1 or OKP1, respectively. For these materials, the full thermal shift from 25 C to 60 C is 9 microns.

For a configuration in which the second element is powered, the materials of the first through sixth lens elements can be Zeonex 480R, PEI, Zeonex F52R, OKP4, Zeonex F52R, and OKP4, respectively.

For a configuration that can use a reduced-size sensor, the materials of the first through sixth lens elements can be Zeonex 480R, Polystyrene, Zeonex F52R, OKP4, Zeonex F52R, and OKP4, respectively.

For comparison, a typical plastic design with these parameters can have a full thermal shift of 22 to 26 microns, a typical plastic design with a glass molded optic can have a thermal shift of 16 microns, and a well-corrected plastic design with a glass molded optic can have a thermal shift of 4 microns.

Figure 8:
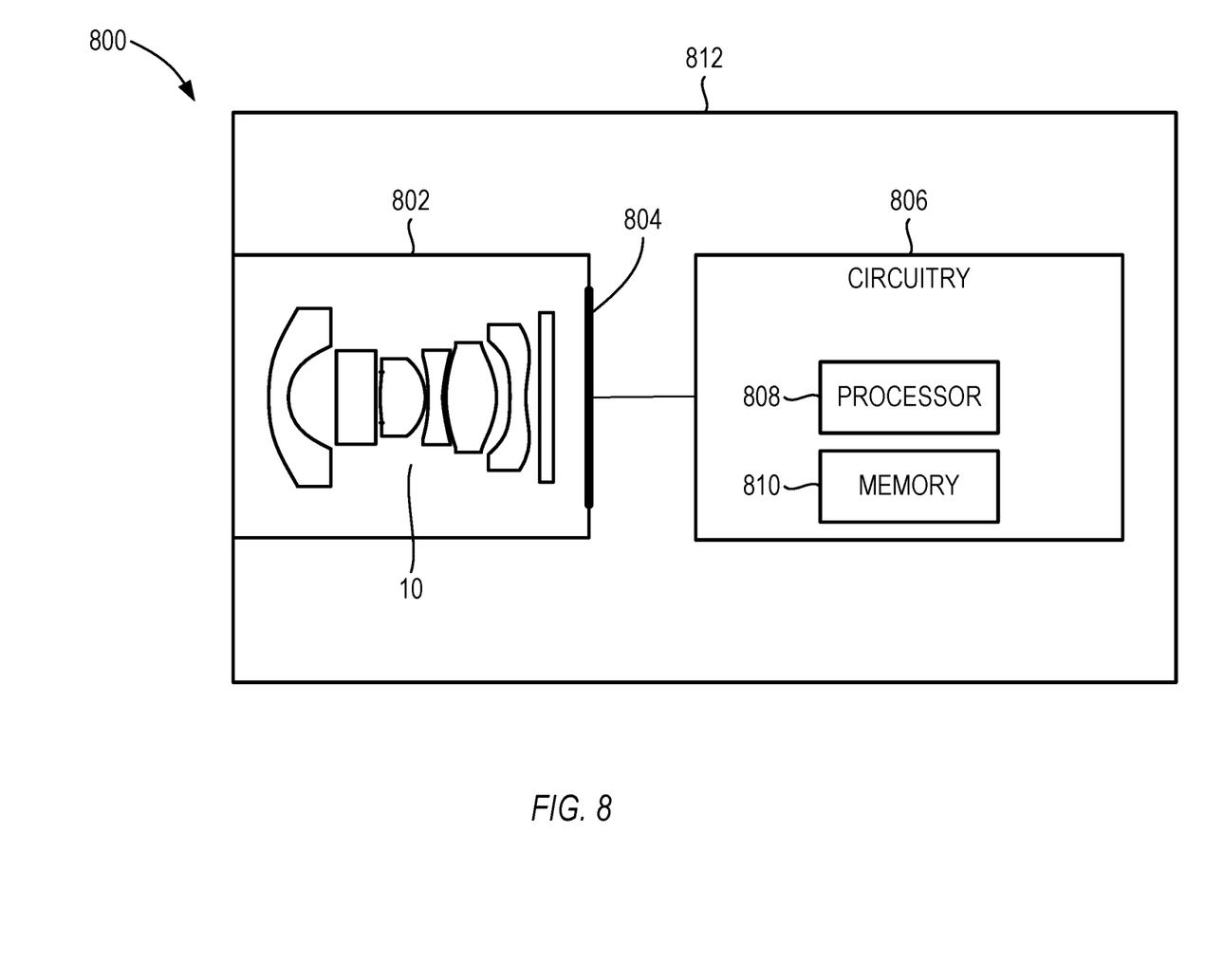
FIG. 8 shows an example of a device that includes an imaging lens assembly, in accordance with some examples.

FIG. 8 shows an example of a device 800 that includes an imaging lens assembly, such as assembly 10 of FIGS. 1 and 2, in accordance with some examples. The device 800 can be a mobile phone with a camera, a stand-alone camera, a camera integrated with an additional piece of equipment, or another suitable device. The device 800 can include a housing 812 that surrounds the components of the device 800. The device 800 can include the optical elements of the lens assembly 10 mounted in a plastic barrel with plastic spacers 802. Light from an object passes through the lens assembly 10. A sensor 26 can detect the light from the lens assembly 10. The sensor 26 can convert the sensed light to an electrical signal. Circuitry 806 can convert the electrical signal into data representing an image at the sensor 26. The circuitry 806 can include a processor 808. The circuitry can include memory 810. The memory 810 can include instructions that, when executed by the processor 808, cause the processor to execute instructions. The instructions can include processing the electrical signal, storing and accessing stored images, and the like.

While this invention has been described as having example designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

To further illustrate the device disclosed herein, a non-limiting list of examples is provided below. Each of the following non-limiting examples can stand on its own, or can be combined in any permutation or combination with any one or more of the other examples.

EXAMPLE 1

An imaging lens assembly having a positive total refractive power, the imaging lens assembly comprising in order from an object side to an image side: a first lens element with negative refractive power between 51% and 68% of the total refractive power; a second lens element with zero or positive refractive power between 0% and 5% of the total refractive power; a third lens element with positive refractive power between 75% and 110% of the total refractive power; a fourth lens element with negative refractive power between 42% and 61% of the total refractive power; a fifth lens element with positive refractive power between 91% and 112% of the total refractive power; and a sixth lens element with a negative refractive power between 38% and 97% of the total refractive power.

EXAMPLE 2

The imaging lens assembly of example 1, wherein the first, second, third, fourth, fifth, and sixth elements are formed from plastic.

EXAMPLE 3

The imaging lens assembly of any one of examples 1-2, wherein the first, second, third, fourth, fifth, and sixth elements are mounted in a plastic barrel and are spaced apart by plastic spacers.

EXAMPLE 4

The imaging lens assembly of any one of examples 1-3, wherein: the first lens element is formed from a material having an Abbe number greater than 50; the second lens element is formed from a material having an Abbe number less than 35; the third lens element is formed from a material having an Abbe number greater than 50; the fourth lens element is formed from a material having an Abbe number less than 27; the fifth lens element is formed from a material having an Abbe number greater than 50; and the sixth lens element is formed from a material having an Abbe number less than 27.

EXAMPLE 5

The imaging lens assembly of any one of examples 1-4, wherein: the first lens element is formed from a material having a dn/dT less than $-99 \times 10^{-6}/°$ C.; the third lens element is formed from a material having a dn/dT greater than $-95 \times 10^{-6}/°$ C.; the fourth lens element is formed from a material having a dn/dT less than $-118 \times 10^{-6}/°$ C.; the fifth lens element is formed from a material having a dn/dT greater than $-95 \times 10^{-6}/°$ C.; and the sixth lens element is formed from a material having a dn/dT less than $-118 \times 10^{-6}/°$ C.

EXAMPLE 6

The imaging lens assembly of any one of examples 1-5, wherein: the first lens element is formed from Zeonex 480R, has an Abbe number of 56, and has a dn/dT of $-106 \times 10^{-6}/°$ C.; the second lens element is formed from OKP-A1, has an Abbe number of 22, and has a dn/dT of $-133 \times 10^{-6}/°$ C.; the third lens element is formed from Zeonex F52R, has an Abbe number of 56, and has a dn/dT of $-93 \times 10^{-6}/°$ C.; the fourth lens element is formed from OKP4, has an Abbe number of 27, and has a dn/dT of $-152 \times 10^{-6}/°$ C.; the fifth lens element is formed from Zeonex F52R, has an Abbe number of 56, and has a dn/dT of $-93 \times 10^{-6}/°$ C.; and the sixth lens element is formed from OKP1, has an Abbe number of 22, and has a dn/dT of $-138 \times 10^{-6}/°$ C.

EXAMPLE 7

The imaging lens assembly of any one of examples 1-6, wherein the first, third, fourth, fifth, and sixth lens elements are aspheric.

EXAMPLE 8

The imaging lens assembly of any one of examples 1-7, wherein an aperture stop of the imaging lens assembly is positioned at an object-side surface of the third lens element.

EXAMPLE 9

The imaging lens assembly of any one of examples 1-8, further comprising a blue glass absorptive filter positioned between the sixth lens element and an image plane.

EXAMPLE 10

An imaging lens assembly having a positive total refractive power, the imaging lens assembly comprising in order from an object side to an image side: a first lens element with negative refractive power and formed from a material having an Abbe number greater than 50; a second lens element formed from a material having an Abbe number less than 35; a third lens element with positive refractive power and formed from a material having an Abbe number greater than 50; a fourth lens element with negative refractive power and formed from a material having an Abbe number less than 27; a fifth lens element with positive refractive power and formed from a material having an Abbe number greater than 50; and a sixth lens element with a negative refractive power and formed from a material having an Abbe number less than 27.

EXAMPLE 11

The imaging lens assembly of example 10, wherein the first, second, third, fourth, fifth, and sixth elements are formed from plastic.

EXAMPLE 12

The imaging lens assembly of any one of examples 10-11, wherein the first, second, third, fourth, fifth, and sixth elements are mounted in a plastic barrel and are spaced apart by plastic spacers.

EXAMPLE 13

The imaging lens assembly of any one of examples 10-12, wherein: the first lens element has a negative refractive power between 51% and 68% of the total refractive power; the second lens element has a zero or positive refractive power between 0% and 5% of the total refractive power the third lens element has a positive refractive power between 75% and 110% of the total refractive power; the fourth lens element has a negative refractive power between 42% and 61% of the total refractive power; the fifth lens element has a positive refractive power between 91% and 112% of the total refractive power; and the sixth lens element has a negative refractive power between 38% and 97% of the total refractive power.

EXAMPLE 14

The imaging lens assembly of any one of examples 10-13, wherein the first, third, fourth, fifth, and sixth lens elements are aspheric.

EXAMPLE 15

The imaging lens assembly of any one of examples 10-14, wherein an aperture stop of the imaging lens assembly is positioned at an object-side surface of the third lens element.

EXAMPLE 16

The imaging lens assembly of any one of examples 10-15, wherein: the first lens element is formed from a material having a dn/dT less than $-99\times10^{-6}$/° C.; the third lens element is formed from a material having a dn/dT greater than $-95\times10^{-6}$/° C.; the fourth lens element is formed from a material having a dn/dT less than $-118\times10^{-6}$/° C.; the fifth lens element is formed from a material having a dn/dT greater than $-95\times10^{-6}$/° C.; and the sixth lens element is formed from a material having a dn/dT less than $-118\times10^{-6}$/° C.

EXAMPLE 17

The imaging lens assembly of any one of examples 10-16, wherein: the first lens element is formed from Zeonex 480R, has an Abbe number of 56, and has a dn/dT of $-106\times10^{-6}$/° C.; the second lens element is formed from OKP-A1, has an Abbe number of 22, and has a dn/dT of $-133\times10^{-6}$/° C.; the third lens element is formed from Zeonex F52R, has an Abbe number of 56, and has a dn/dT of $-93\times10^{-6}$/° C.; the fourth lens element is formed from OKP4, has an Abbe number of 27, and has a dn/dT of $-152\times10^{-6}$/° C.; the fifth lens element is formed from Zeonex F52R, has an Abbe number of 56, and has a dn/dT of $-93\times10^{-6}$/° C.; and the sixth lens element is formed from OKP1, has an Abbe number of 22, and has a dn/dT of $-138\times10^{-6}$/° C.

EXAMPLE 18

The imaging lens assembly of any one of examples 10-17, further comprising a blue glass absorptive filter positioned between the sixth lens element and an image plane.

EXAMPLE 19

An imaging lens assembly having a positive total refractive power, the imaging lens assembly comprising in order from an object side to an image side: a first lens element with negative refractive power between 51% and 68% of the total refractive power; a second lens element with positive refractive power between 75% and 110% of the total refractive power; a third lens element with negative refractive power between 42% and 61% of the total refractive power; a fourth lens element with positive refractive power between 91% and 112% of the total refractive power; and a fifth lens element with a negative refractive power between 38% and 97% of the total refractive power.

EXAMPLE 20

The imaging lens assembly of example 19, wherein the first, second, third, fourth, and fifth elements are formed from plastic.

EXAMPLE 21

The imaging lens assembly of any one of examples 19-20, wherein the first, second, third, fourth, and fifth elements are mounted in a plastic barrel and are spaced apart by plastic spacers.

EXAMPLE 22

The imaging lens assembly of any one of examples 19-21, wherein: the first lens element is formed from a material having an Abbe number greater than 50; the second lens element is formed from a material having an Abbe number greater than 50; the third lens element is formed from a material having an Abbe number less than 27; the fourth lens element is formed from a material having an Abbe number greater than 50; and the fifth lens element is formed from a material having an Abbe number less than 27.

EXAMPLE 23

The imaging lens assembly of any one of examples 19-22, wherein: the first lens element is formed from a material having a dn/dT less than $-99\times10^{-6}$/° C.; the second lens element is formed from a material having a dn/dT greater than $-95\times10^{-6}$/° C.; the third lens element is formed from a material having a dn/dT less than $-118\times10^{-6}$/° C.; the fourth lens element is formed from a material having a dn/dT greater than $-95\times10^{-6}$/° C.; and the fifth lens element is formed from a material having a dn/dT less than $-118\times10^{-6}$/° C.

EXAMPLE 24

The imaging lens assembly of any one of examples 19-23, wherein: the first lens element is formed from Zeonex 480R, has an Abbe number of 56, and has a dn/dT of $-106\times10^{-6}$/° C.; the second lens element is formed from Zeonex F52R, has an Abbe number of 56, and has a dn/dT of $-93\times10^{-6}$/° C.; the third lens element is formed from OKP4, has an Abbe number of 27, and has a dn/dT of $-152\times10^{-6}$/° C.; the fourth lens element is formed from Zeonex F52R, has an Abbe number of 56, and has a dn/dT of $-93\times10^{-6}$/° C.; and the fifth lens element is formed from OKP1, has an Abbe number of 22, and has a dn/dT of $-138\times10^{6}$/° C.

EXAMPLE 25

The imaging lens assembly of any one of examples 19-24, wherein the first, second, third, fourth, and fifth lens elements are aspheric.

EXAMPLE 26

The imaging lens assembly of any one of examples 19-25, wherein an aperture stop of the imaging lens assembly is positioned at an object-side surface of the second lens element.

EXAMPLE 27

The imaging lens assembly of any one of examples 19-26, further comprising a blue glass absorptive filter positioned between the fifth lens element and an image plane.

EXAMPLE 28

An imaging lens assembly having a positive total refractive power, the imaging lens assembly comprising in order from an object side to an image side: a first lens element with negative refractive power and formed from a material having an Abbe number greater than 50; a second lens element with positive refractive power and formed from a material having an Abbe number greater than 50; a third lens element with negative refractive power and formed from a material having an Abbe number less than 27; a fourth lens element with positive refractive power and formed from a material having an Abbe number greater than 50; and a fifth lens element with a negative refractive power and formed from a material having an Abbe number less than 27.

EXAMPLE 29

The imaging lens assembly of example 28, wherein the first, second, third, fourth, and fifth elements are formed from plastic.

EXAMPLE 30

The imaging lens assembly of any one of examples 28-29, wherein the first, second, third, fourth, and fifth elements are mounted in a plastic barrel and are spaced apart by plastic spacers.

EXAMPLE 31

The imaging lens assembly of any one of examples 28-30, wherein: the first lens element has a negative refractive power between 54% and 61% of the total refractive power; the second lens element has a positive refractive power between 99% and 105% of the total refractive power; the third lens element has a negative refractive power between 55% and 68% of the total refractive power; the fourth lens element has a positive refractive power between 81% and 91% of the total refractive power; and the fifth lens element has a negative refractive power between 61% and 68% of the total refractive power.

EXAMPLE 32

The imaging lens assembly of any one of examples 28-31, wherein the first, third, fourth, and fifth lens elements are aspheric.

EXAMPLE 33

The imaging lens assembly of any one of examples 28-32, wherein an aperture stop of the imaging lens assembly is positioned at an object-side surface of the second lens element.

EXAMPLE 34

The imaging lens assembly of any one of examples 28-33, wherein: the first lens element is formed from a material having a dn/dT less than $-99\times10^{-6}/°$ C.; the second lens element is formed from a material having a dn/dT greater than $-95\times10^{-6}/°$ C.; the third lens element is formed from a material having a dn/dT less than $-118\times10^{-6}/°$ C.; the fourth lens element is formed from a material having a dn/dT greater than $-95\times10^{-6}/°$ C.; and the fifth lens element is formed from a material having a dn/dT less than $-118\times10^{-6}/°$ C.

EXAMPLE 35

The imaging lens assembly of any one of examples 28-34, wherein: the first lens element is formed from Zeonex 480R, has an Abbe number of 56, and has a dn/dT of $-106\times10^{-6}/°$ C.; the second lens element is formed from Zeonex F52R, has an Abbe number of 56, and has a dn/dT of $-93\times10^{-6}/°$ C.; the third lens element is formed from OKP4, has an Abbe number of 27, and has a dn/dT of $-152\times10^{-6}/°$ C.; the fourth lens element is formed from Zeonex F52R, has an Abbe number of 56, and has a dn/dT of $-93\times10^{-6}/°$ C.; and the fifth lens element is formed from OKP-A1, has an Abbe number of 22, and has a dn/dT of $-138\times10^{-6}/°$ C.

EXAMPLE 36

The imaging lens assembly of any one of examples 28-35, further comprising a blue glass absorptive filter positioned between the sixth lens element and an image plane.

EXAMPLE 37

A mobile device, comprising a processor and memory, the memory including instructions that, when executed by the processor, cause the processor to store a digital image generated by the imaging lens assembly of any one of examples 1-36.

What is claimed is:

1. An imaging lens assembly having a positive total refractive power, the imaging lens assembly comprising in order from an object side to an image side:
   a first lens element with negative refractive power between 51% and 68% of the total refractive power;
   a second lens element with zero or positive refractive power between 0% and 5% of the total refractive power;
   a third lens element with positive refractive power between 75% and 110% of the total refractive power;
   a fourth lens element with negative refractive power between 42% and 61% of the total refractive power;
   a fifth lens element with positive refractive power between 91% and 112% of the total refractive power; and
   a sixth lens element with a negative refractive power between 38% and 97% of the total refractive power,
   wherein:
   the first lens element is formed from a material having a dn/dT less than $-99\times10^{-6}/°$ C.;
   the third lens element is formed from a material having a dn/dT greater than $-95\times10^{-6}/°$ C.;
   the fourth lens element is formed from a material having a dn/dT less than $-118\times10^{-6}/°$ C.;
   the fifth lens element is formed from a material having a dn/dT greater than $-95\times10^{-6}/°$ C.; and
   the sixth lens element is formed from a material having a dn/dT less than $-118\times10^{-6}/°$ C.

2. The imaging lens assembly of claim 1, wherein the first, second, third, fourth, fifth, and sixth elements are formed from plastic.

3. The imaging lens assembly of claim 1, wherein the first, second, third, fourth, fifth, and sixth elements are mounted in a plastic barrel and are spaced apart by plastic spacers.

4. The imaging lens assembly of claim 1, wherein:
   the first lens element is formed from a material having an Abbe number greater than 50;
   the second lens element is formed from a material having an Abbe number less than 35;
   the third lens element is formed from a material having an Abbe number greater than 50;
   the fourth lens element is formed from a material having an Abbe number less than 27;
   the fifth lens element is formed from a material having an Abbe number greater than 50; and the sixth lens element is formed from a material having an Abbe number less than 27.

5. The imaging lens assembly of claim 1, wherein the first, third, fourth, fifth, and sixth lens elements are aspheric.

6. The imaging lens assembly of claim 1, wherein an aperture stop of the imaging lens assembly is positioned at an object-side surface of the third lens element.

7. The imaging lens assembly of claim 1, further comprising a blue glass absorptive filter positioned between the sixth lens element and an image plane.

8. A mobile device, comprising a processor and memory, the memory including instructions that, when executed by the processor, cause the processor to store a digital image generated by the imaging lens assembly of claim 1.

9. An imaging lens assembly having a positive total refractive power, the imaging lens assembly comprising in order from an object side to an image side:
- a first lens element with negative refractive power between 51% and 68% of the total refractive power:
- a second lens element with zero or positive refractive power between 0% and 5% of the total refractive power;
- a third lens element with positive refractive power between 75% and 110% of the total refractive power:
- a fourth lens element with negative refractive power between 42% and 61% of the total refractive power;
- a fifth lens element with positive refractive power between 91% and 112% of the total refractive power; and
- a sixth lens element with a negative refractive power between 38% and 97% of the total refractive power, wherein:
the first lens element is formed from Zeonex 480R, has an Abbe number of 56, and has a dn/dT of $-106 \times 10^{-6}/°$ C.;
the second lens element is formed from OKP-A1, has an Abbe number of 22, and has a dn/dT of $-133 \times 10^{-6}/°$ C.;
the third lens element is formed from Zeonex F52R, has an Abbe number of 56, and has a dn/dT of $-93 \times 10^{-6}/°$ C.;
the fourth lens element is formed from OKP4, has an Abbe number of 27, and has a dn/dT of $-152 \times 10^{-6}/°$ C.;
the fifth lens element is formed from Zeonex F52R, has an Abbe number of 56, and has a dn/dT of $-93 \times 10^{-6}/°$ C.; and
the sixth lens element is formed from OKP1, has an Abbe number of 22, and has a dn/dT of $-138 \times 10^{-6}/°$ C.

10. An imaging lens assembly having a positive total refractive power, the imaging lens assembly comprising in order from an object side to an image side:
- a first lens element with negative refractive power and formed from a material having an Abbe number greater than 50;
- a second lens element formed from a material having an Abbe number less than 35;
- a third lens element with positive refractive power and formed from a material having an Abbe number greater than 50;
- a fourth lens element with negative refractive power and formed from a material having an Abbe number less than 27;
- a fifth lens element with positive refractive power and formed from a al having an Abbe number greater than 50; and
- a sixth lens element with a negative refractive power and formed from a material having an Abbe number less than 27, wherein:
the first lens element is formed from a material having a dn/dT less than $-99 \times 10^{-6}/°$ C.;
the third lens element is formed from a material having a dn/dT greater than $-95 \times 10^{-6}/°$ C.;
the fourth lens element is formed from a material having a dn/dT less than $-118 \times 10^{-6}/°$ C.;
the fifth lens element is formed from a material having a dn/dT greater than $-95 \times 10^{-6}/°$ C.; and
the sixth lens element is formed from a material having a dn/dT less than $-118 \times 10^{-6}/°$ C.

11. The imaging lens assembly of claim 10, wherein the first, second, third, for fifth, and sixth elements are formed from plastic.

12. The imaging lens assembly of claim 10, wherein the first, second, third, fourth, fifth, and sixth elements are mounted in a plastic barrel and are spaced apart by plastic spacers.

13. The imaging lens assembly of claim 10, wherein:
the first lens element has a negative refractive power between 51% and 68% of the total refractive power;
the second lens element has a zero or positive refractive power between 0% and 5% of the total refractive power
the third lens element has a positive refractive power between 75% and 110% of the total refractive power;
the fourth lens element has a negative refractive power between 42% and 61% of the total refractive power;
the fifth lens element has a positive refractive power between 91% and 112% of the total refractive power; and
the sixth lens element has a negative refractive power between 38% and 97% of the total refractive power.

14. The imaging lens assembly of claim 10, wherein the first, third, fourth, fifth, and sixth lens elements are aspheric.

15. The imaging lens assembly of claim 10, wherein an aperture stop of the imaging lens assembly is positioned at an object-side surface of the third lens element.

16. The imaging lens assembly of claim 10, further comprising a blue glass absorptive filter positioned between the sixth lens element and an image plane.

17. A mobile device, comprising a processor and memory, the memory including instructions that, when executed by the processor, cause the processor to store a digital image generated by the imaging lens assembly of claim 10.

18. An imaging lens assembly having a positive total refractive power, the imaging lens assembly comprising in order from an object side to an image side:
- a first lens element with negative refractive power and formed from a material having an, Abbe number greater than 50;
- a second lens element formed from a material having an Abbe number less than 35;
- a third lens element with positive refractive power and formed from a material having an Abbe number greater than 50;
- a fourth lens element with negative refractive power and formed from a material having an Abbe number less than 27:
- a fifth lens element with positive refractive power and formed from a material having an Abbe number greater than 50; and
- a sixth lens element with a negative refractive power and formed from a material having an Abbe number less than 27, wherein:

the first lens element is formed from Zeonex 480R, has an Abbe number of 56, and has a dn/dT of $-106\times10^{-6}$/° C.;

the second lens element is formed from OKP-A1, has an Abbe number of 22, and has a dn/dT of $-133\times10^{-6}$/° C.;

the third lens element is formed from Zeonex FS2R, has an Abbe number of 56, and has a dn/dT of $-93\times10^{-6}$/° C.;

the fourth lens element is formed from OKP4, has an Abbe number of 27, and has a dn/dT of $-152\times10^{-6}$/° C.;

the fifth lens element is formed from Zeonex F52R, has an Abbe number of 56, and has a dn/dT of $-93\times10^{-6}$/° C.; and the sixth lens element is formed from OKP1, has an Abbe number of 22, and has a dn/dT of $-138\times10^{-6}$/° C.

\* \* \* \* \*